United States Patent Office 2,797,129
Patented June 25, 1957

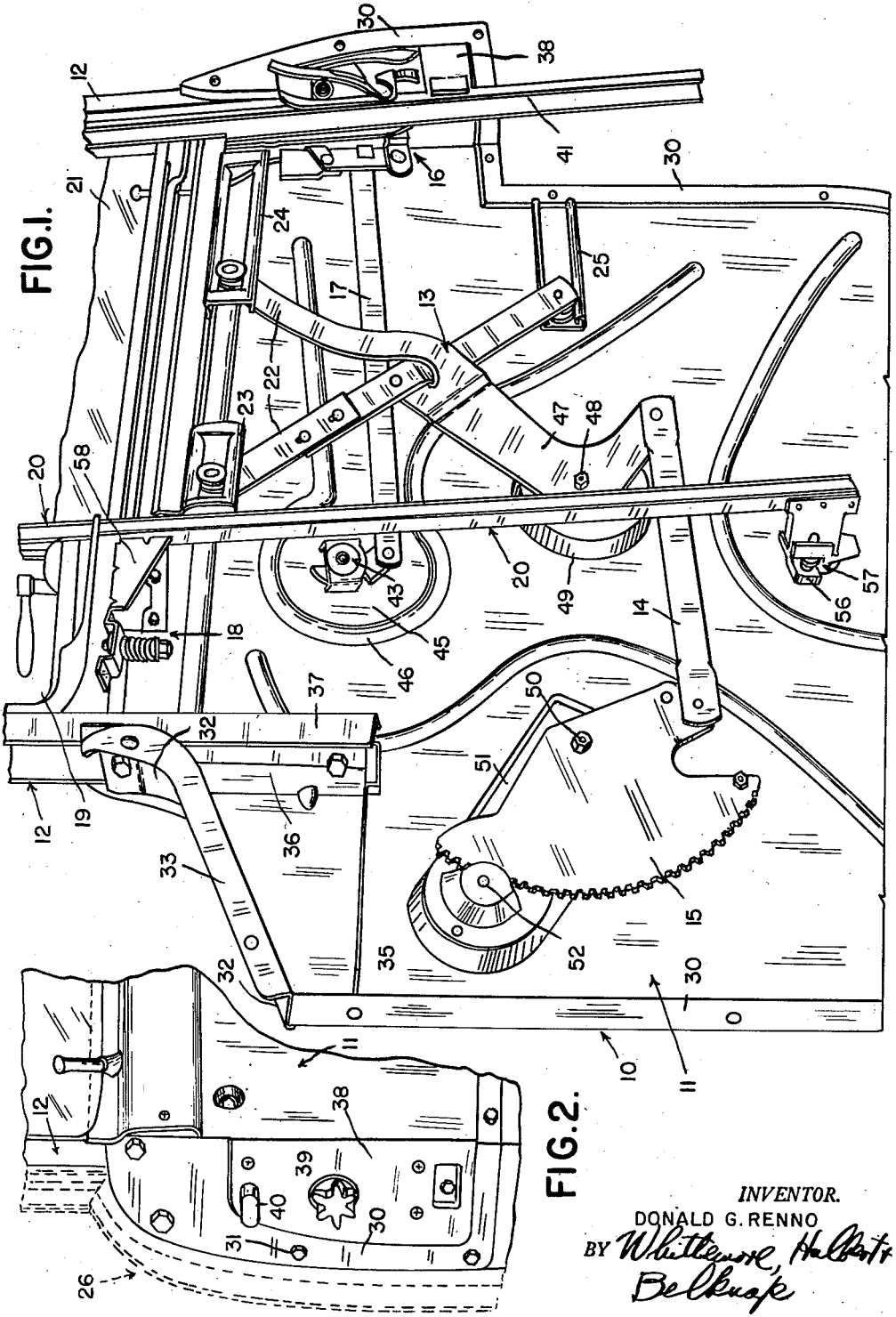

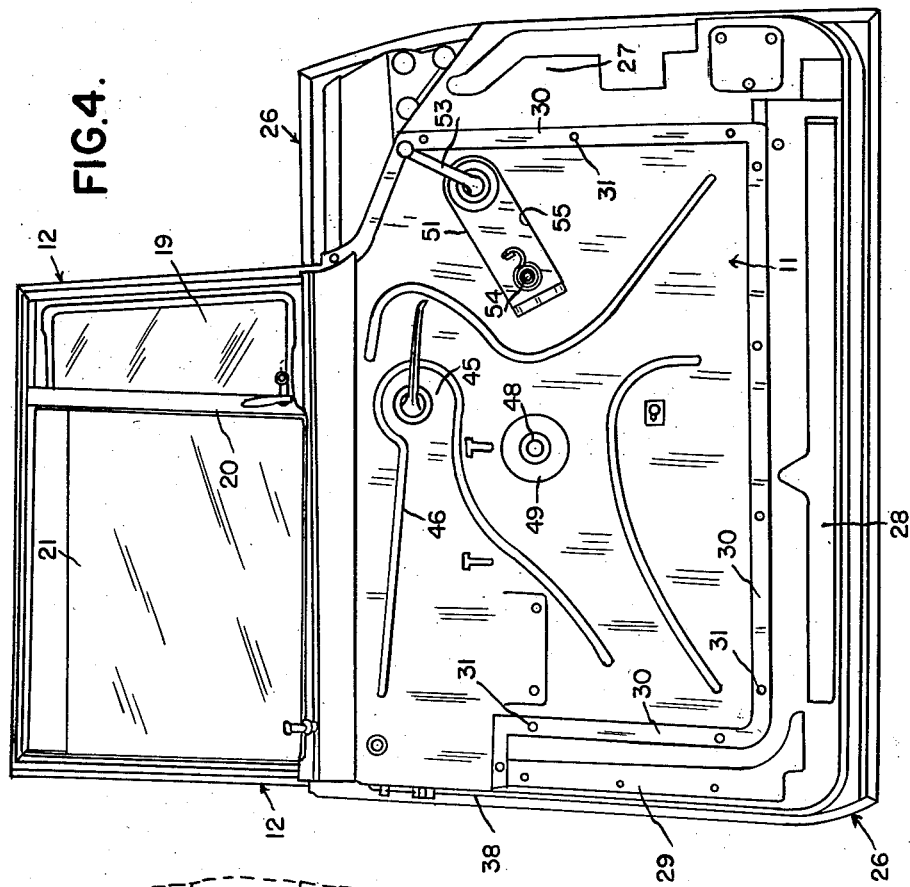
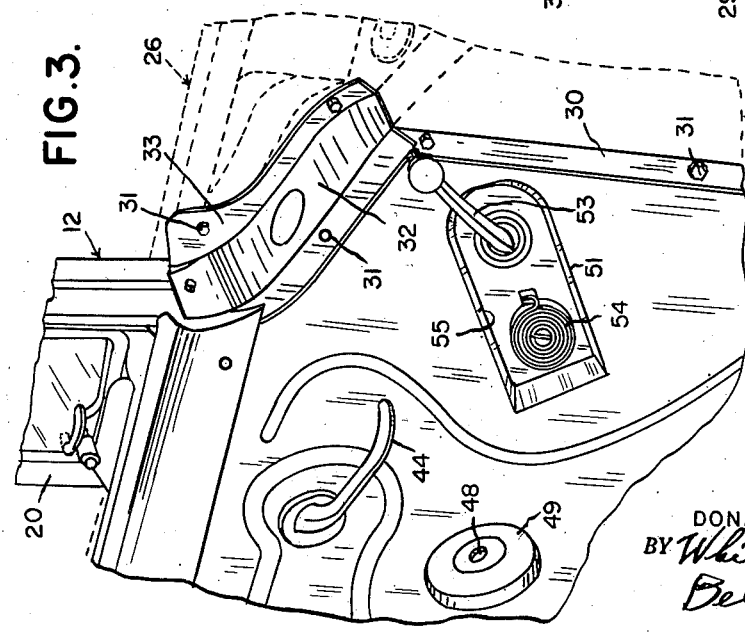

2,797,129

VEHICLE DOOR STRUCTURE

Donald G. Renno, Birmingham, Mich., assignor to Motor Products Corporation, Birmingham, Mich., a corporation of New York Application February 6, 1956, Serial No. 563,687

5 Claims. (Cl. 296—44)

This invention relates to an improvement in automotive door structure and has for its general object the provision of a simplified and unitary, rigid inner door panel arrangement whereby diverse control and operating mechanisms may be fully integrated with the inner panel and preassembled thereto for subsequent installation upon a principal supporting door structure.

It is customary, in the manufacture of automotive doors of the sliding window type, to employ a structure generally comprising inner and outer panel stampings that are marginally joined and longitudinally disposed to form a window-receiving well. Mechanisms for control of the sliding window glass and for locking and lock control are provided as separate sub-assemblies, the detail parts of which are assembled to separate carrier or mounting plates to adapt the mechanisms for individual attachment to the vertical faces of the inner panel of the principal door structure. This assembly practice requires that the main door panel be provided with numerous mounting and access holes, provisions for the adjustment of the locations of mechanisms, plates for covering and sealing access holes, and the like. Access, for assembly of some of the mechanisms, is often difficult. These and other deficiencies of common practice are deleterious to product quality and cost.

It is therefore an object of this invention to provide a door structure for an automotive or like vehicle, wherein a single, one-piece inner panel of substantial area is provided and adapted for assembly to a principal suporting door structure, on the interior side wall thereof, which inner panel is suitably embossed and stiffened to mount the various operating mechanisms associated with the door and thereby eliminate the need for separate mounting plates for these mechanisms. In this manner the number of parts is reduced, less material is required, assembly labor saved and the various mechanisms are properly positioned and related to each other.

More specifically, it is an object to provide an inner door panel unit or structure as described in the form of a generally rectangular metal inner panel which is equipped with outwardly projecting flange members adjacent opposite ends thereof, preferably at the top zone of the inner panel proper, for rigid attachment to the basic supporting door assembly. The principal vertical face area of the panel is suitably embossed for stiffening reasons and suitably apertured to receive the detail parts of the several operating, locking and control mechanisms as, for example, a regulator to control the sliding window glass, an operating mechanism for a swingable ventilating window panel, a door latch mechanism and a remote control for the latch mechanism, the door latch mechanism being transversely disposed at the rear of the inner panel, upon one of the flange members referred to above. The forward of these flange members is adapted to fit the contouring of the support basic door structure.

It is a further object of the invention to provide an improved inner door panel unit as described, which has provisions associated therewith, as at the outwardly projecting end flanging thereof, for the mounting of a window frame in which the sliding window and ventilator act, the assembled inner panel unit and frame thus constituting an improved "package" type of structure adapted for assembly with a basic supporting door structure that can be previously hung and fitted to a body structure.

The foregoing as well as other objects of the invention will become more apparent as this description proceeds, especially when taken in conjunction with the accompanying drawings, in which:

Figure 1 is a fragmentary perspective view of the improved inner door panel of the invention, showing the manner in which it serves as a mount for various operating instrumentalities of the door;

Figure 2 is a fragmentary and perspective view, as from the right hand end of Figure 1, showing certain details of formation of the panel, the outer door panel being indicated in dotted line;

Figure 3 is a fragmentary perspective view of inner panel structure from the left hand end of Figure 1, outer door details again being indicated in dotted line; and Figure 4 is an elevational view of the improved inner panel as assembled to the outer panel, being viewed from the inside of the construction.

The improvement of the invention is generally designated 10 and, as illustrated in Figure 1 of the drawings, comprises an inner door panel unit 11, and a window frame unit 12 rigidly associated therewith and serving as a mount for various movable operating mechanisms of the door. Although the number and nature of these instrumentalities has no particular bearing on the invention, they may be generally identified as a scissor-type window regulator mechanism 13, operated by a rigid strap or link 14 from an arcuate toothed sector 15; a latch mechanism 16 controlled by an actuator link 17; and a suitable pivoting device 18 for a swingable ventilator window 19 of well known type, which is mounted in the forward portion of the frame 12, immediately forwardly of the usual downwardly extending division bar 20 thereof. As stated, these instrumentalities are all entirely conventional and are illustrated and described solely because they are mounted on the inner side of the improved panel 11 without recourse to the separately applied mounting plates or their equivalent heretofore considered necessary equipment in the manufacture of a vehicle door.

The usual vertically acting window controlled by the regulator mechanism 13 is designated 21, being operatively connected to the latter by extension arms 22 which have pivotal and sliding reception in pivoting guide members 23, 24 welded to the inner door panel 11 adjacent its top. The mechanism 13 is also controlled in part by a further sliding and pivoting guide 25 welded to panel 11 at a lower elevation.

The reference numeral 26 generally designates the outer door panel (shown in dotted line in Figures 2 and 3), which is of a conventional type. As it happens, the panel 26 actually shown is continuously flanged inwardly around its forward zone (providing an end pillar structure 27), at its bottom (providing a sill structure 28), and upwardly a substantial distance along its rear zone (providing a rear pillar 29). However, the outer door panel 26 may vary as to these details, and, in accordance with its outline and contouring, the inner panel 11 will be conformed appropriately to adapt the two panel parts for assembly as a rigid door body.

As illustrated in the drawings, the inner door panel 11 is of generally rectangular outline, as modified to conform same in the manner just mentioned. It is of substantial length and width in relation to the dimensions of the outer panel 26, as best illustrated in Figure 4, and it is offset slightly inwardly at 30 about its front, bottom and rear margins to receive bolts or rivets 31 which lock it to the pillar and sill structures 27, 28, 29 of the outer panel 26.

At the forward end thereof, as viewed from the right of Figure 4 and as best shown in Figures 1 and 3, the panel 11 is marginally inclined upwardly and to the rear and is provided with an integral, outwardly flanged extension 32 which covers a cut away (not shown) adjoining the forward pillar structure 27 of the outer door panel 26; and the flange 32 carries an upwardly extending lip 33 along its length which is attached by bolts or rivets 31 to the outer door panel. An auxiliary plate 35 (see Figure 1) may be welded to the flanged portion 32, depending from the same and provided with a flange 36 which serves as a rigid mounting support for the lower extremity of the forward portion 37 of the window frame 12.

At the opposite, rear end of the inner door panel 11, and adjacent the top thereof, as best illustrated in Figures 1 and 2 of the drawings, the panel is provided with a further integral out-turned flange 38 of substantial area. This flange extends approximately perpendicular at a 90-degree angle to the remainder of the panel on which it is formed; and the latch unit 16 of the door structure is carried by it, the flange 38 being apertured to receive parts 39, 40 of this structure, as shown in Figure 2. The enlarged rear flange 38 also serves as a support for the lower portion 41 of the window frame 12, in the same general way that its portion 37 is sustained. My copending application, Serial No. 563,686, filed Feb. 6, 1956, is directed to an improvement in this respect as to which the present invention is not directly concerned.

The operating link 17 of the latch device 16 extends forwardly thereof, to be pivotally connected to the remote control operator 43; to which the handle 44 (Figure 3) is secured. This connection is made at a flattened area 45 of the panel 11, outlined by a rigidifying embossed formation 46.

The window regulator linkage 13 has its scissor-actuating link 47 pivoted at 48 on a circular, outwardly projection embossment 49 of substantial area and axial depth formed in the panel 11 adjacent its mid-point; while the arcuate toothed sector 15 of the regulator mechanism is similarly pivoted at 50 on a correspondingly deep embossment 51 in the panel 11. In this case, the embossment is of somewhat elongated, generally rectangular shape, and it also rotatively mounts at 52 the shaft of a window regulator handle 53 (Figure 3), which, like the handle 44, is disposed interiorly of the panel 11, inwardly of the usual upholstering applied to the latter (not shown). A conventional torsion spring 54 associated with the above described meshing elements is received in the housing space afforded at 55 by the outwardly projecting embossment 51.

If desired, a further embossment 56 of relatively small size may be formed in the panel 11 at a lower, approximately central point thereon, to serve as a support for an adjustable device 57.

An inner door panel unit as described, preferably one having a window framing structure associated therewith, constitutes a very practical and inexpensive arrangement, by which the various operating instrumentalities for the window regulator, latch, etc., are quickly and securely mounted, without requiring special mounting plates. A comparison of the window regulator embossment 51 as shown in Figs. 1 and 3, respectively, will clarify this advantage. The forming of the various embossments 46, 49, 51 is accomplished at an early phase in the manufacture of the door, and their contouring and positioning may be such that a relatively few arrangements in these respects may be standardized for the production of different styles of automotive doors of the same or different manufacture. As assembled to the embossments, the operating parts have a mounting not subject to looseness and rattling, and not likely to come out of adjustment.

The invention affords an integrated assembly of one piece panel and its mounting provisions operating mechanisms for door and window, and frame in which the window parts operate, which is extremely inexpensively produced and assembled, and which insures a long life of successful operation.

The drawings and the foregoing specification constitute a description of the improved vehicle door structure in such full, clear, concise and exact terms as to enable any person skilled in the art to practice the invention, the scope of which is indicated by the appended claims.

What I claim as my invention is:

1. An integral, one-piece inner door structure adapted for association with an outer panel to constitute an automotive door, said structure comprising a sheet metal panel of substantial area having integral, outwardly flanged front and rear end portions adjacent its top which are of a width to extend substantially to said outer panel, whereby to be secured thereto and to support certain operating parts of said door on at least one thereof, and having local outwardly projecting embossments between said portions to mount operating mechanisms.

2. An integral, one-piece inner door structure adapted for association with an outer panel to constitute an automotive door, said structure comprising a sheet metal panel of substantial area having integral, outwardly flanged front and rear end portions adjacent its top which are disposed in generally inclined and vertical planes, respectively, and are of a width to extend substantially to said outer panel, whereby to be secured thereto and to support certain operating parts of said door on at least one thereof.

3. An integral, one-piece inner door structure adapted for association with an outer panel to constitute an automotive door, said structure comprising a sheet metal panel of substantial area having integral, outwardly flanged front and rear end portions adjacent its top which are of a width to extend substantially to said outer panel, whereby to be secured thereto and to support certain operating parts of said door on at least one thereof, and an intermediate portion connecting said flanged end portions and provided with spaced outwardly directed embossments of area adequate to mount movable operating mechanisms of said door.

4. An integral, one-piece inner door structure adapted for association with an outer panel to constitute an automotive door, said structure comprising a sheet metal panel of substantial area having integral, outwardly flanged front and rear end portions which are disposed in generally inclined and vertical planes, respectively, and are of a width to extend substantially to said outer panel, whereby to be secured thereto and to support certain operating parts of said door on at least one thereof.

5. An integral, one-piece inner door structure adapted for association with an outer panel to constitute an automotive door, said structure comprising a sheet metal panel of substantial area having integral, outwardly flanged front and rear end portions which are of a width to extend substantially to said outer panel, whereby to be secured thereto and to support certain operating parts of said door on at least one thereof, and an intermediate portion connecting said flanged end portions and provided with spaced outwardly directed embossments of area adequate to mount movable operating mechanisms of said door.

References Cited in the file of this patent

UNITED STATES PATENTS

| | | |
|---|---|---|
| 2,658,790 | Fish et al. | Nov. 10, 1953 |
| 2,733,096 | Waterhouse | Jan. 31, 1956 |